United States Patent [19]
Edwards

[11] Patent Number: 5,913,787
[45] Date of Patent: Jun. 22, 1999

[54] COMMUNICATIONS CONDUIT CONNECTOR MOUNTING DEVICE

[76] Inventor: John R. Edwards, 36 Greenside Dr., Nobleton, Ontario, Canada, L0G 1N0

[21] Appl. No.: 08/914,784

[22] Filed: Aug. 20, 1997

[51] Int. Cl.$^6$ .............................. H02G 3/24; F16M 13/00
[52] U.S. Cl. .......................... 52/220.7; 174/48; 248/300; 248/906
[58] Field of Search ............................... 52/220.7, 220.1, 52/36.1; 174/48, 50, 52.1, 54, 58, 61; 248/27.1, 300, 906

[56] References Cited

U.S. PATENT DOCUMENTS

| | | | |
|---|---|---|---|
| 1,818,814 | 8/1931 | Riggs et al. | 248/300 |
| 2,708,089 | 5/1955 | Bissell . | |
| 3,865,969 | 2/1975 | Mulvey | 174/48 |
| 4,140,293 | 2/1979 | Hansen | 174/58 X |
| 4,882,453 | 11/1989 | Chelsea | 174/48 |
| 5,289,934 | 3/1994 | Smith et al. | 248/906 X |
| 5,452,873 | 9/1995 | Laughlin | 248/906 |
| 5,806,258 | 9/1998 | Miedema et al. | 52/220.7 |

*Primary Examiner*—Robert Canfield
*Attorney, Agent, or Firm*—Riches, McKenzie & Herbert

[57] ABSTRACT

A communications conduit connector mounting device comprising a support member adapted to carry a communications conduit connector for joining together ends of at least two communication conduit for transmission of signals therebetween, which support member depends from an engagement member adapted for engaging an interior structure of a panel system for supporting the support member within the interior of the panel system. Preferably the engagement member may comprise a hook mechanism removably engaging a horizontal member attached to a frame forming the panel assembly which frame has covers removably mounted to at least one side of the frame. The hook mechanism engages the horizontal member such as the bracket carrying the connector locates the connector within the internal space disposed for ready access of the removable cover. Preferably the hook mechanism is capable of being moved to a plurality of positions along the length of the horizontal member in which in each position the support member locates the connector within the interior space exposed for easy access on removal of the removable cover. More preferably the hook mechanism is slidably movable along the length of the horizontal member.

33 Claims, 11 Drawing Sheets

COMMUNICATIONS CONDUIT CONNECTOR MOUNTING DEVICE

FIELD OF THE INVENTION

This invention relates generally to a device for mounting communications conduit connectors to modular office furniture systems.

BACKGROUND OF THE INVENTION

Modular office furniture systems utilizing modular partitions are well known for the advantages of increased efficiency in the use of space and the ability to adapt and make changes to any particular configuration selected.

Many different forms of partitions are known which comprise a panel assembly consisting of a rectangular frame including vertical and horizontal frame members and with covers removably mounted to the frame on at least one side of the frame such that the panel assembly provides an interior space within the frame accessible by removal of the removable cover. A preferred panel assembly is taught by the present applicant's U.S. Pat. No. 5,406,760 to Edwards issued Apr. 18, 1995. Other known panel assemblies include those taught by U.S. Pat. No. 4,685,225 to Kelly issued Aug. 11, 1987 and U.S. Pat. No. 5,209,035 to Hodges et al issued May 11, 1993.

An important feature of such office panel systems is the ability to lay-in, customize and modify communications conduit such as wiring and optical cable used to connect and transmit signals between electronic equipment such as telephones, facsimile machines, computers including peripherals such as servers, printers, modems, speakers and the like. Known panel assemblies provide convenient access openings throughout the length of the panel assemblies for ease of exit and egress of communication conduit as for example to permit communication conduit to exit from or enter into the interior space defined by the panel assembly at different positions along the length of the panel as to permit easy placement of telephones, computers and the like at varying different locations as may be desired by a user and adjusted from time to time.

Known panel assemblies, however, suffer the disadvantage that there is not a convenient mechanism for the easily securing within the panel connectors for interconnecting two or more communications conduit as is typically necessary as for example to couple a telephone with a telephone communication conduit.

BACKGROUND OF THE INVENTION

Accordingly, to at least partially overcome these disadvantages of previously known devices the present invention provides a communications conduit connector mounting device providing a support member to receive a communications conduit connector to join together the ends of two communications conduit, and with the support member depending from a hanger mechanism adapted for engaging the interior structure of the panel assembly.

An object of the present invention is to provide a communications connector mounting device providing a support plate for attachment of a communications conduit connector and depending from a suspension mechanism to engage the interior structure of a panel assembly.

Another object is to provide a communications conduit connector mounting device which is adapted to engage a horizontal member of a panel assembly to be movable to a plurality of positions along the length of the horizontal member, preferably to be slidably movable along the length of the horizontal member.

Another object is to provide a communications conduit connector mounting device comprising an outlet-box forming portion which is open at both ends and preferably at one of its top, bottom, interior or exterior sides so as to provide a shielded cavity for at least a portion of a communications conduit connector, however having an open side to permit easy exit and entrance of communications conduit.

Another object is to provide a communications conduit connector mounting device which is readily removable from or engagable onto an interior structure of a panel assembly for ease of removal and access when a removable cover mounted to the panel assembly may by removed.

Another object is to provide a simple communications conduit connector mounting device which is adapted to be located at a plurality of positions within the interior space of a panel assembly.

Accordingly, the present invention in one aspect provides a communications conduit connector mounting device comprising a support member adapted to carry a communications conduit connector for joining together ends of at least two communication conduit for transmission of signals therebetween, which support member depends from an engagement member adapted for engaging an interior structure of a panel system for supporting the support member within the interior of the panel system. Preferably the engagement member may comprise a hook mechanism removably engaging a horizontal member attached to a frame forming the panel assembly which frame has covers removably mounted to at least one side of the frame. The hook mechanism engages the horizontal member such that the bracket carrying the connector locates the connector within the internal space disposed for ready access of the removable cover. Preferably the hook mechanism is capable of being moved to a plurality of positions along the length of the horizontal member in which in each position the support member locates the connector within the interior space exposed for easy access on removal of the removable cover. More preferably the hook mechanism is slidably movable along the length of the horizontal member.

The support bracket member may comprise an outlet-box forming portion comprising a first elongate U-shaped channel member extending parallel the horizontal member open along its length on one side and at both ends. The hook mechanism may comprise a second elongate U-shape channel member extending parallel the horizontal member also open along its length on one side and at both ends. With such configurations, preferred versions of the invention can permit the device to have a substantially constant cross-section profile in cross-section normal the horizontal member and preferably with profiles selected from S-shapes and C-shapes. The hook mechanism is preferably configured so as to engage the horizontal member in a manner to fixedly secure the device thereto against pivoting relative the horizontal member, preferably with at least one side of the support bracket member to receive the connector disposed vertically. This can be accomplished by having the hook mechanism engage the horizontal member at locations spaced longitudinally along the frame member sufficient to prevent pivoting of the apparatus about any horizontal axis normal the horizontal member and by having the hook member engage the horizontal member on each lateral side of the horizontal member to prevent pivoting of the device about any axis parallel the horizontal member.

While the support bracket member may comprise a simple planar member, it is preferred that the bracket member include a planar shield portion extending generally parallel a mount portion of the bracket member carrying the connector spaced therefrom to provide a partially protected space between the mount portion and the shield portion for connections between the connector and at least some of the conduits. Preferably the bracket member also includes an upwardly directed trough open upwardly and at its ends and extending parallel the horizontal member to assist in receiving at least one of the communication conduit. A channel member preferably also carries securement devices to assist on securing of conduit thereto.

BRIEF DESCRIPTION OF THE DRAWINGS

Further aspects and advantages of the invention will become apparent having regard to the following description taken together with the accompanying drawings in which.

DETAILED DESCRIPTION OF THE DRAWINGS

Figure 1:
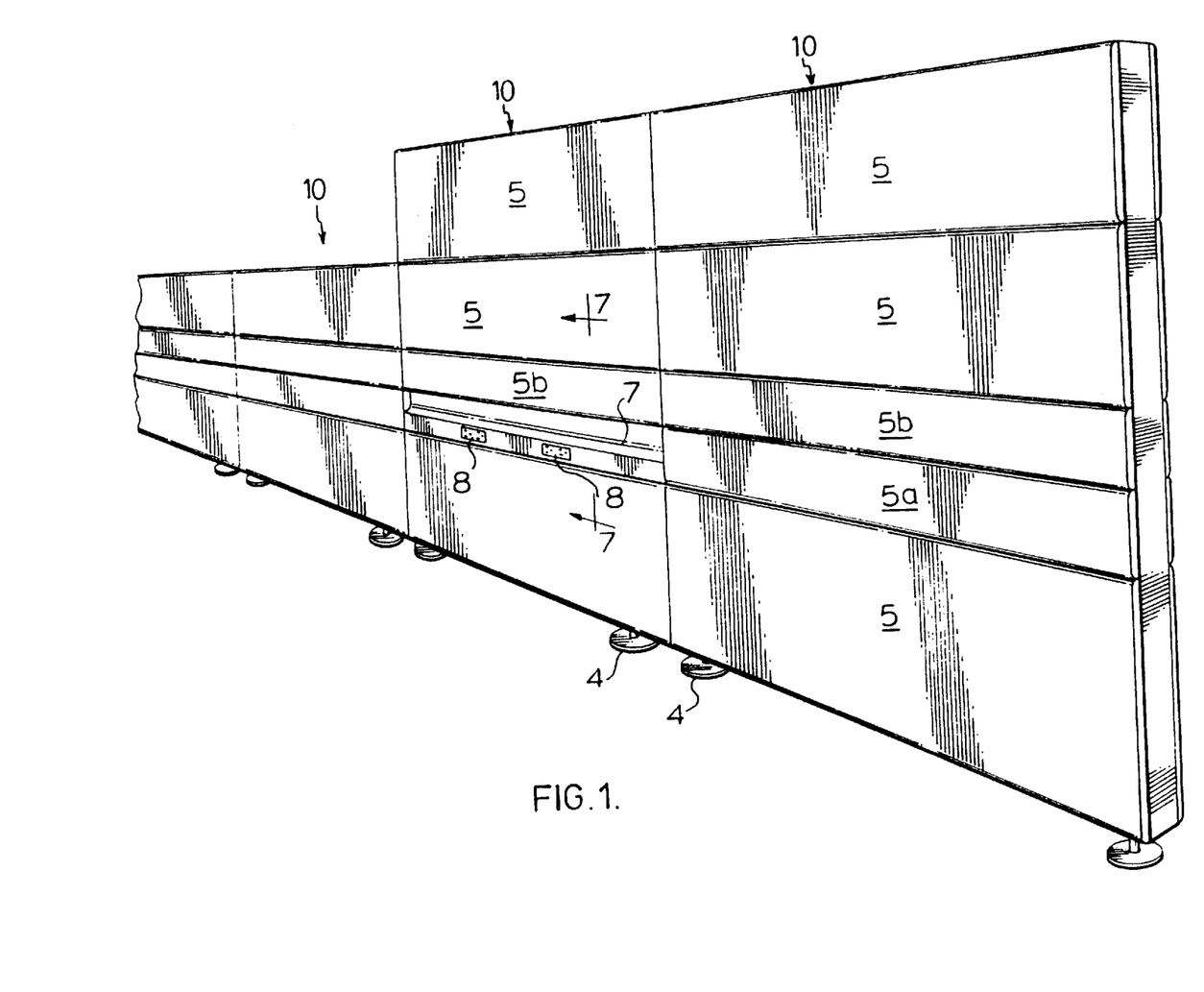
FIG. 1 shows a frontal prospective elevation view of an assembled modular office furniture partition wall including a number of panel assemblies in accordance with U.S. Pat. No. 5,406,760.
Figure 2:
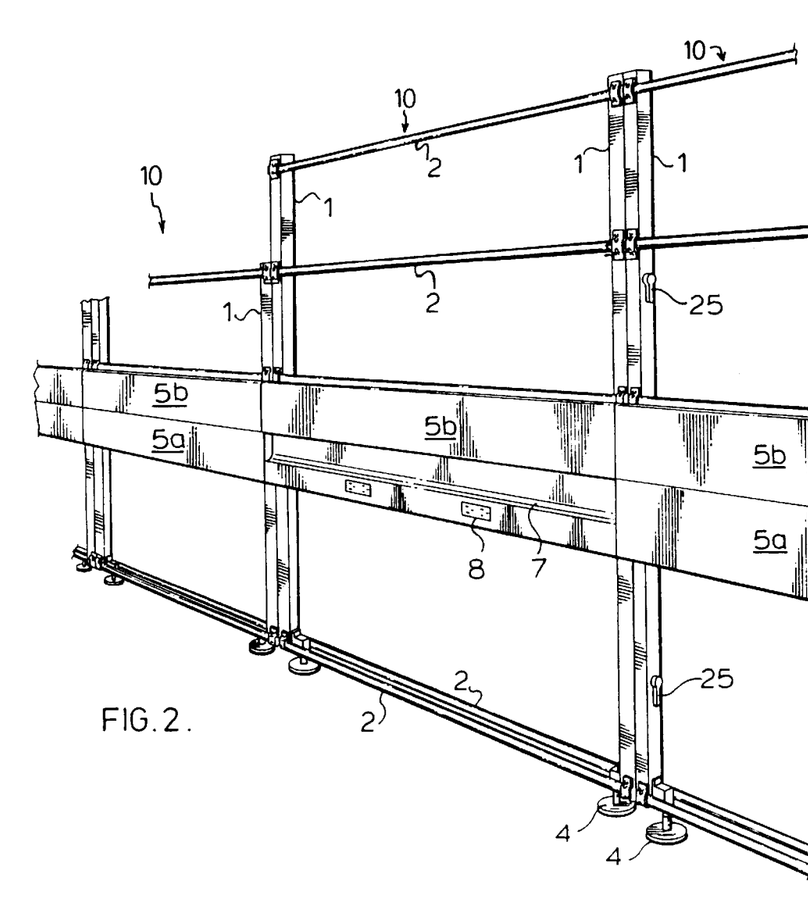
FIG. 2 is a frontal prospective view of the partition wall of FIG. 1 with some of the cladding covers removed to reveal the internal partition frames.

Each of FIGS. 1, 2, 4, 5 and 6 illustrate a panel assembly in accordance with U.S. Pat. No. 5,406,760, the disclosure of which is incorporated herein by reference. The partition wall illustrated comprises a plurality of rectangular panel assemblies generally indicated 10 shown to be arranged end to end for convenience. Each panel assembly comprises a generally rectangular frame including vertical frame members or post 1 and horizontal frame members or beams 2. The beams 2 are preferably arranged in parallel pairs on both sides of each post 1. The beams 2 are connected to the outward opposing front and rear faces of each post 1 in an overlapping moment resisting connection. Both the posts 1 and the beams 2 are shown as tubular in cross-section. The post 1 and beams 2 are connected with brackets 3 having a saddle portion of internal profile mating with the external profile of the beams 2. The brackets 3 include flange portions above and below the saddle portion which overlie and are connected to the outward, forward or rearward face of the associated post 1 as by screws, rivets, welding and the like. The posts 1 of adjacent panel assemblies are connected as shown in FIG. 2 in line with the posts 1 of adjacent panels as by connectors generally indicated as 25.

Figure 5:
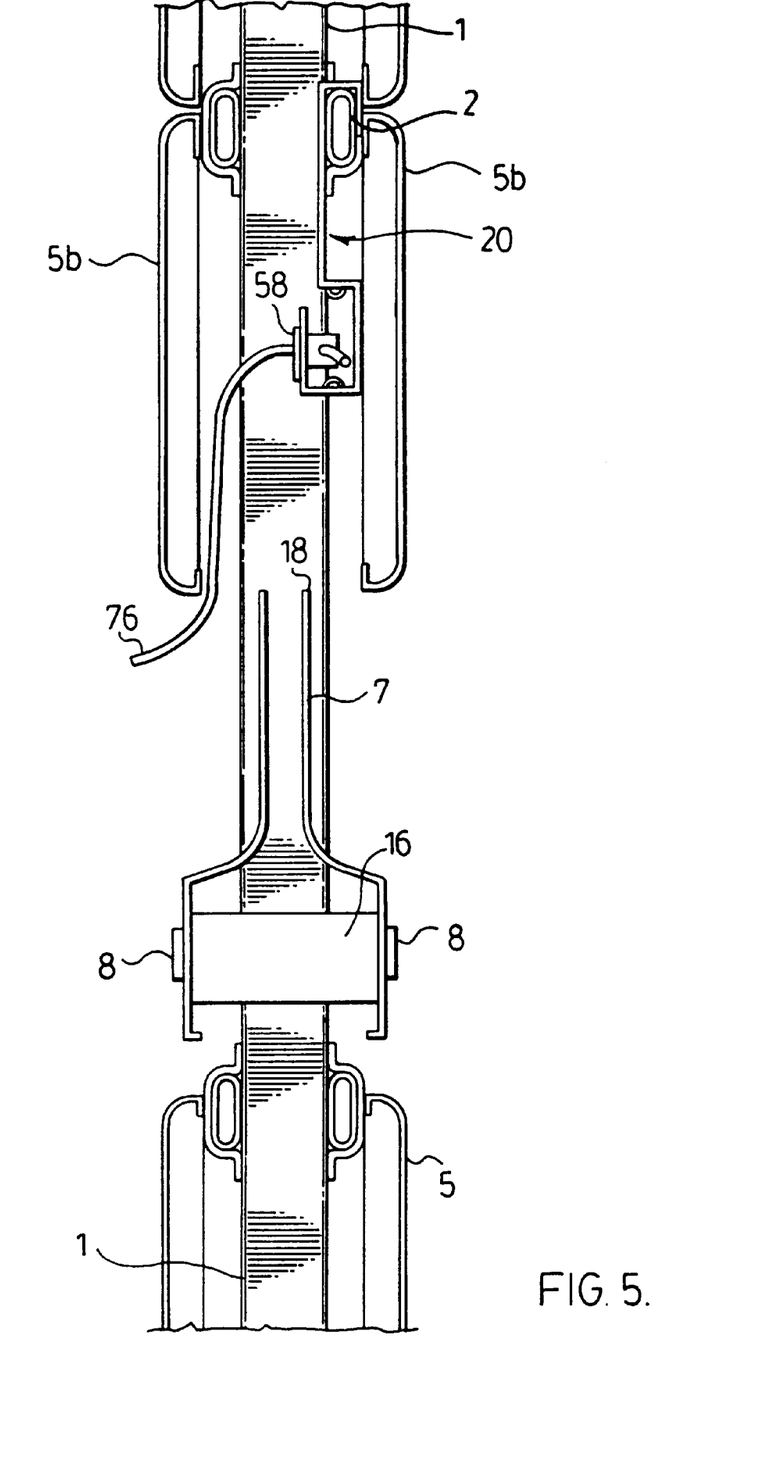
FIG. 5 is a cross-sectional end view through a middle portion of the panel assembly of FIG. 1 along section line V–V$^1$ in FIG. 1.
Figure 6:
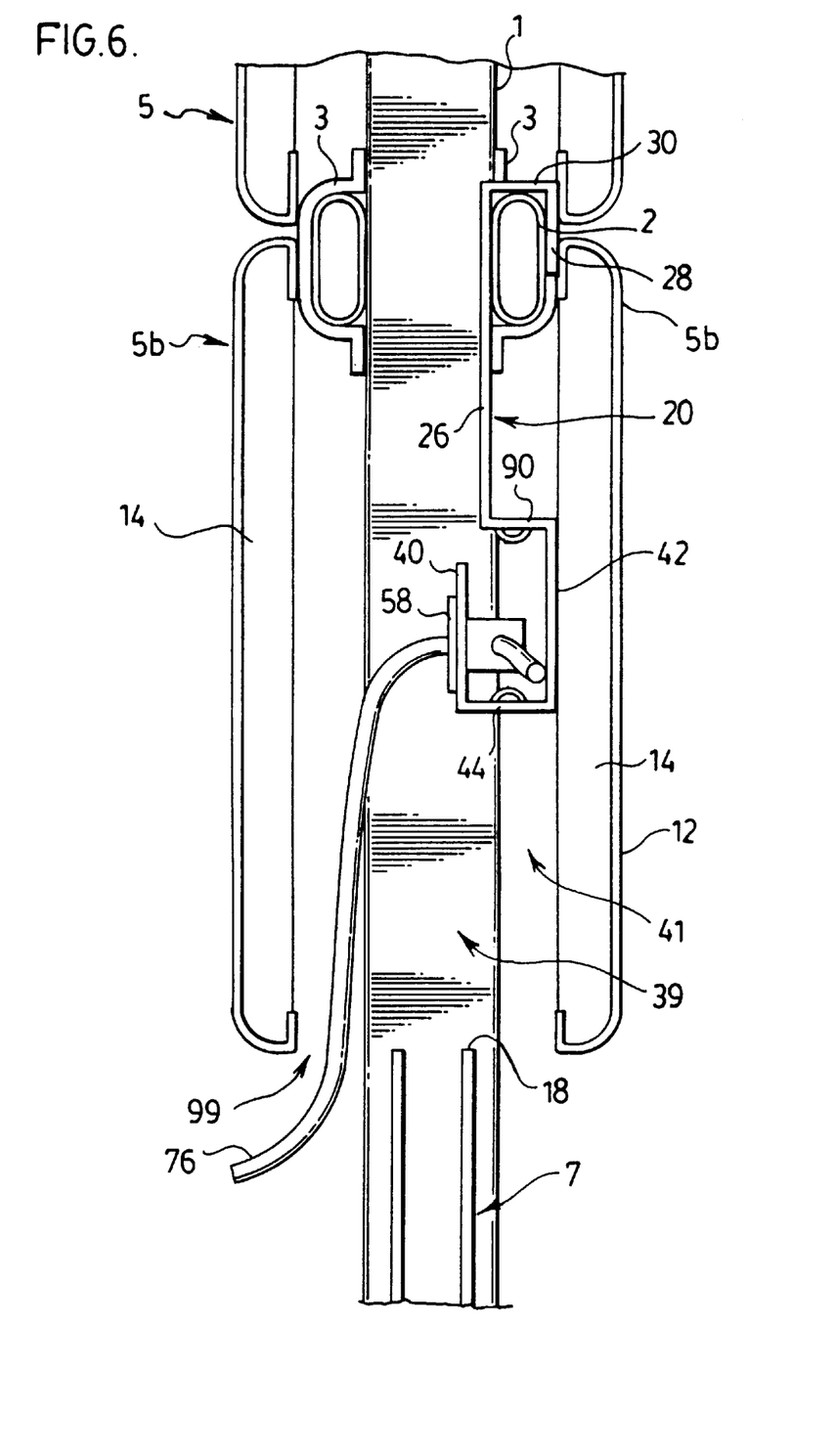
FIG. 6 is an enlarged view of central portions of FIG. 5.

Cladding covers indicated generally as 5 but also specifically as 5a or 5b are removably coupled to the frame as best seen in FIGS. 2, 5 and 6 laterally outward of the beams 2. As best seen in FIG. 6, due to the thickness of the brackets 3, a vertical space is present between the beams 2 and inward portions of the covers 5 other than where the brackets are present. Mechanisms are provided for mounting the covers 5 to the frame however such mounting mechanisms are not illustrated for the purpose of simplicity. The mounting mechanism preferably comprise resilient clips to engage portions of each covers 5 with the clips preferably secured between adjacent beams 2 or to the post 1. Each cover 5 preferably comprises a skin of sheet metal generally indicated 12 and having at each end a plastic end plug 14 which assists in maintaining the sheet metal in its desired form. The end plug 14 provides a means for engagement of the mounting mechanisms so as to realisably couple each cover 5 to the frame. As shown each panel 5 preferably spans between adjacent parallel vertically spaced pairs of beams 2 however in a middle portion of the panel assembly there are shown cover 5a and 5b which do not span between adjacent beams 2 but rather are removably coupled to each frame and generally span half the distance between two adjacent beams 2.

The panel assembly illustrated is to be appreciated as formed with an open gridwork of posts 1 and beams 2 with the result that the panel assembly has an open interior cavity which advantageously permits the passage of wires and cables therein. This interior cavity is made up of a vertically extending central post space 39 together with horizontally extending raceways 41 adjacent and open to the central post space 39. The central post space 39 is defined between the posts 1, that is between a forward plane including the forward face of each post 1 and a rearward plane including a rearward face of each post 1. The central post space 39 extends vertically between the spaced, parallel forward and rearward planes and between interior faces of the post 1. The central post space 39 extends continuously vertically throughout the height of the partition open upwardly to above the top of the partition and open downwardly to below the lowest beam of the partition.

A plurality of raceways 41 extend horizontally between the beams 2 outward of the respective of the forward or rearward planes. The raceways 41 extend a full width of each partition and are open at each end to beyond the exterior end faces of the posts. The raceways 41 are defined inward of the covers 5 and extend forwardly and rearwardly from the respective forward and rearward planes the combined thicknesses of the beams 2 and the saddle portion of the brackets 3. In addition, the raceways 41 also include an interior space within the cover 5, that is a space between the ends 14 of each cover which is in communication with the raceway 41 and thus extends the raceway 41 laterally outwardly to the metal sheet 12 forming the cover.

The raceways 41 are open on their interior sides to the central post space 39 over the entire distance between the posts 1. Whereas the central post space 39 ends at the interior end faces of the post 1, the raceways 41 provide for passageway for conduit horizontally past the posts outward of the posts inward of the covers. Similarly the central post space 39 provides a passageway for conduit vertically past the beams 2 inward of the beams and inward of the covers. The raceways 41, central post space 39 and covers 5 define an interior cavity in the panel assembly which permits conduit to be routed vertically throughout the partition between the post 1 inside the beams and horizontally across the partition and between adjacent partitions in the raceways outside the post 1, between the beams 2 and inside the covers 5.

FIGS. 1, 2 and 5 show a recessed panel 7 adapted to carry horizontally extending electrical cables. The panel 7 preferably comprises sheet metal removably coupled to the frame by a coupling mechanism not show and carrying an internal electrical outlet-box 16 carrying electrical power outlets 8 accessible on either side of the panel assembly through openings in the recessed panel 7. Such recessed panel 7 may optionally be closed from view by a half cover 5a as shown in FIGS. 1 and 2.

The recessed panel 7 has its upper end 18 recessed inwardly from the cover 5b and thus provides a vertically extending space or gap 99 therebetween particularly advantageous for passage of communication conduit.

Reference is now made to FIG. 3 to 6 which show a preferred embodiment of a communications conduit connector mounting device generally indicated 20. The device includes a hanger mechanism generally indicated 22 and a connector support member generally indicated 24. The hanger mechanism 22 is adapted to engage the horizontal frame member comprising beam 2 so as to support the connector support member 24 in a position within the interior cavity of the panel assembly. The hanger mechanism 24 shown as comprising an elongate U-shaped hook channel member which has two parallel side walls 26 and 28 joined by a bridging side wall 30 to form an elongate hook forming cavity 32 therebetween open along its length at one open side indicated 34 and at both ends 36 and 38.

Figure 3:
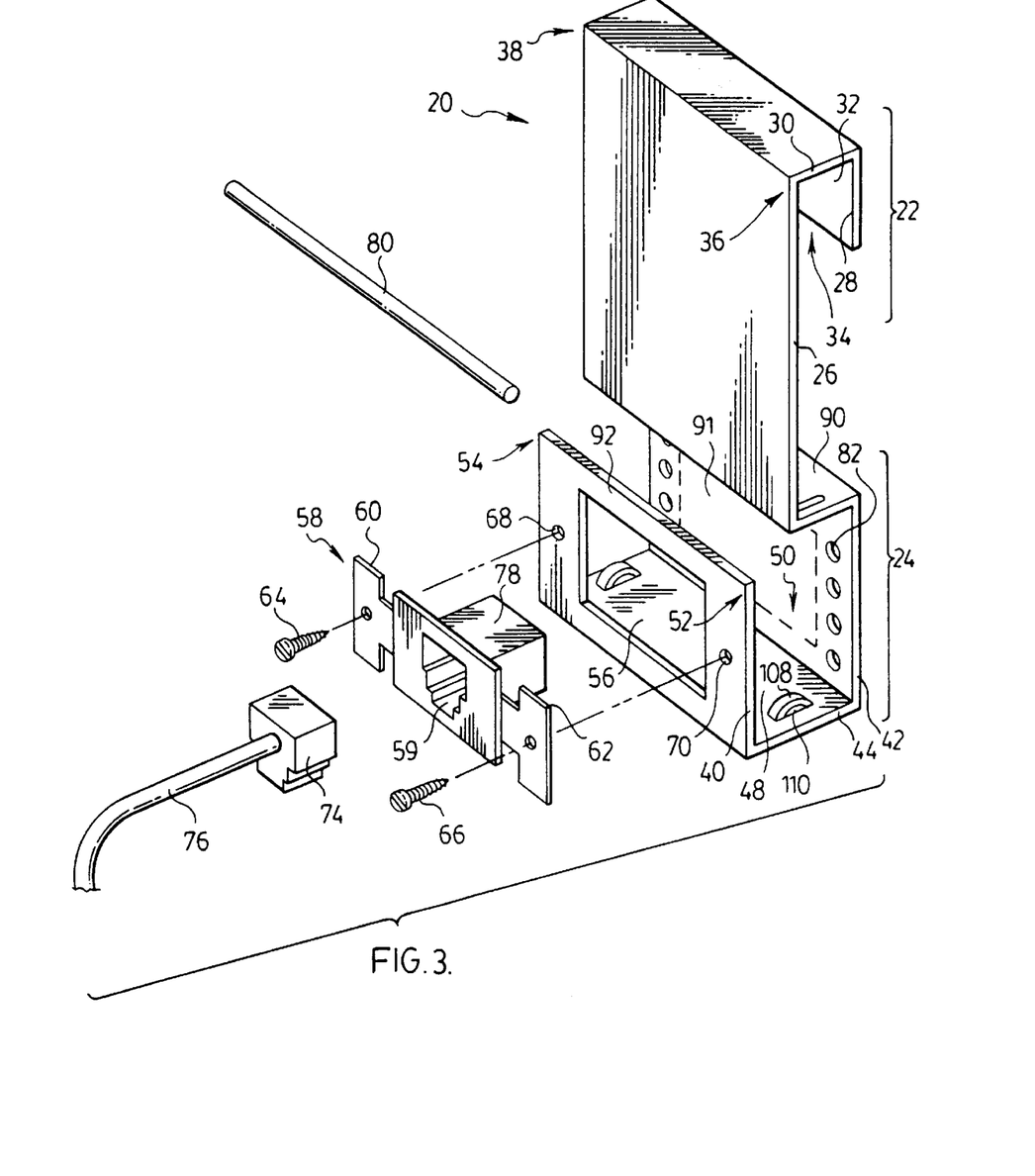
FIG. 3 is an exploded schematic view showing a communications conduit connector mounting device in accordance with a first preferred embodiment of the present invention together with a preferred connector, a telephone jack and a conduit to connect to the connector.

The connector support member 24 comprises an outlet-box forming portion which is in the form an elongate U-shaped box channel member with two parallel side walls 40 and 42 joined by a bridging side wall 44 to define an elongate generally rectilinear cavity 48 therebetween. The channel member and its cavity is open along its length at one open side 50 between the two opposed side walls 40 and 42 and opposite the bridging side wall 44. The channel member and its cavity are also open at open ends 52 and 54.

The box channel member of the connector support member 24 extends parallel the hook channel member of the hanger mechanism 22.

The side wall 40 of the connector support member 24 carries a major aperture 56 therethrough adapted to receive a conduit connector 58. The conduit connector is schematically illustrated as a commercially known type such as for example sold under the trademark Leviton. As is known the connector 58 is provided with a connector tabs 60 and 62 at either end each carrying a hole by which screws 64 and 66 may secure the connector 58 within the aperture 56 by engaging in threaded holes 68 and 70 in the side wall 40.

The connector 58 carries a female socket 59 of the type known for use with telephone connections and adapted to receive in a quick connect snap connection, a male plug 74 connected to a first conduit 76. The connector 58 also include at its rear as generally indicated 78 a connection mechanism for connection of the end of one or more other conduit in known manner. As shown in FIG. 3 a second conduit 80 is shown whose end is adapted to be engaged to the rear end 78 of the connector 58.

The side wall 42 is shown as being provided with a number of holes 82 which as described later may be used to assist in securing a conduit to the connector support member 24.

Figure 4:
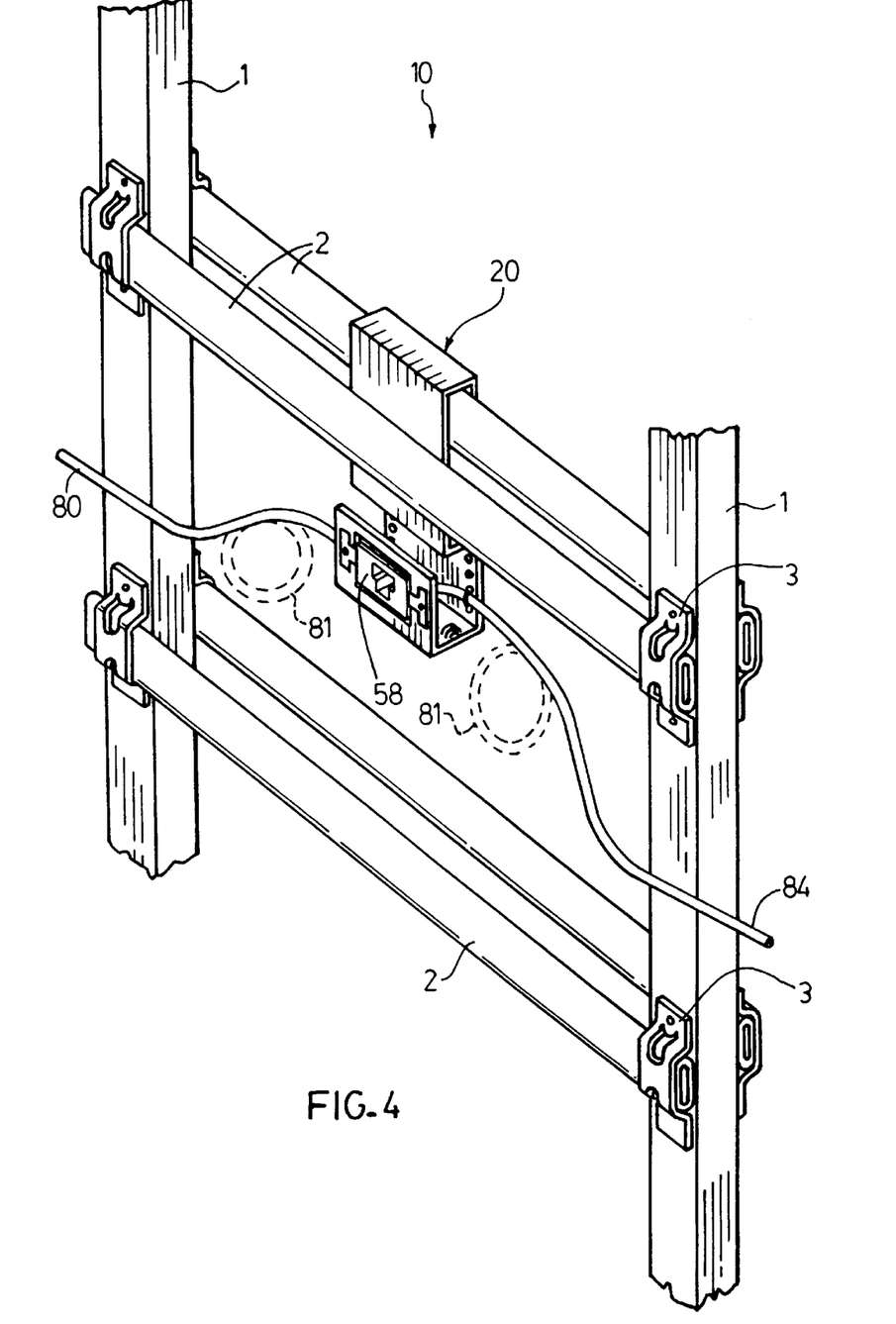
FIG. 4 is a schematic pictorial view illustrating the mounting device and connector shown in FIG. 3 located on a section on a rectangular frame of a panel assembly of the same construction as that shown in FIGS. 1 and 2.

Reference is now made to FIG. 4 which shows the mounting device 20 of FIG. 3 mounted in the interior cavity of a panel assembly having a construction substantially the same as that shown in FIGS. 1 and 2 and with the covers removed therefrom. As seen, the hanger mechanism 22 and its hook channel member forms a hook member with the side walls 26 and 28 forming arms of the hook and the bridging side wall 30 forming the bight. The hook member closely engages about the right hand most beam 2 with the side walls 26 and 28 engaging the inward and outward surfaces of the beam, respectively, and the bridging side wall 30 engaging the top of the beam such that the device 20 is suspended from the beam with the connector support member 24 disposed therebelow and located with the side wall 40 being disposed vertically and facing towards the left hand side of the partition as shown. With the hook channel member extending parallel the horizontal beam 2, is to be appreciated that the hook mechanism can be placed on the right hand beam 2 at a plurality positions along the length of the beam, that is at an infinite number of sequential positions spaced along the beam between the posts 1. Preferably the hook channel member is sized to frictionally engage the beam 2 however to permit longitudinal sliding of the hanger mechanism 22 along the beam 2.

As seen in FIG. 4, communications conduit indicated as the second conduit 80 and a third conduit 84 are connected to the rear of the connector 58 with each conduit extending from the connector 58 horizontally through the cavity 48 of the connector support member 24 out one of the opens ends 52 and 54 of the cavity and subsequently through the interior cavity of the panel assembly and out of the panel assembly horizontally through the raceways 41 outward of the posts 1. The third conduit 84 is secured to the side wall 42 of the connector support member 24 by a plastic strap which extends through two adjacent of the holes 82 and about the conduit 84. This plastic strap can comprise known strap forming devices with an eyelet at one end through which the other end of the strap is drawn and which eyelet frictionally engages the strap to resist withdrawal.

Reference is now made to FIGS. 5 and 6 which illustrates the device 20 as suspended from the right hand beam 2 as in FIG. 4 however in these specific context of the panel assembly illustrated in FIGS. 1 and 2 and disposed behind covers 5b mounted above recessed panels 7. As shown, the device 20 has its hanger mechanism 22 disposed such that the side wall 28 extends vertically downwardly in a vertically extending lateral space defined between the beam 2 and the covers 5 and 5b. This lateral space is provided between the covers and the beam the thickness of the bracket 3 and with the side wall 28 having a width not greater, and preferably less than the bracket 3, the side wall 28 may readily extend vertically through the lateral space.

Referring to FIG. 6, with only the left hand side cover 5b removed, a person can reach into the interior cavity of the partition and remove or engage the mounting device 20 on the right hand beam 2, by merely vertically sliding the mounting device 20 to slide the side wall 28 between the right hand beam 2 and the right hand covers 5 and 5b. Neither the left hand cover 5 nor the right hand covers 5 and 5b need to be removed to permit installation, removal or relocation of the mounting device 20. In removal, once side wall 28 is above the right hand beam 2, the mounting device can be moved horizontally to between the horizontal pair of beams 2 and then vertically downwardly in the central post space 39 to below the beams from which it may be moved horizontally to the left between the left hand beam 2 and the top 18 of the recessed panel 7. In order to permit the mounting device 20 to be removed from the beam 2 by movement vertically and then horizontally, the distance between the lower end of the side wall 28 and the flange 90 must be greater than the vertical height of the beam 2 at least in the context of a hanger as shown in which the flange 90 and/or the connector support member 24 extends vertically under the beam 2.

It is to be appreciated that by merely removing the removable left hand cover 5b access is readily provided to the device 20 and its connector 58 for connection of the conduit to the connector, for plugging or unplugging of the plug 74 and for relocation of the device 20 at varying locations spaced longitudinally along the beam 2 between the posts. Preferably when initially coupling the second and third conduit 80 and 84 to the connector 58, additional lengths of the conduit may be provided in a coil for each of the second and third conduits such that there is sufficient extra length of each conduit to permit location of the device 20 at any location on the beam between the posts without the need to connect or reconnect the conduits 80 or 84. Such coils of additional conduit are schematically shown in FIG. 4 as in dashed lines as coils 81. The first conduit 76 is shown to extend from the connector 58 downwardly across central post space 39 and through the left hand side raceway 41 and out under the bottom of the left hand cover 5b in the space between the left hand cover 5b and the left hand recessed panel 7.

FIGS. 5 and 6 show the mounting device 20 with its hook member secured over the right hand beam 2 with the side wall 40 facing towards the left hand side. It is to be appreciated that the mounting device 20 could be removed and reversed to assume a mirror image position with the hook member over the left hand beam 2 and with the side wall 40 facing towards the right hand side.

As seen in FIG. 6, the cavity 48 of the connector support member 24 opens upwardly and towards the left hand side. This is achieved by having the device 20 having a generally S-shaped profile in side view normal the horizontal frame member as best seen in FIG. 6. In this regard the side wall 26 which forms an arm of the hook member closest the left hand cover 5b extends inwardly of the right hand beam 2 between the two beams 2 and downwardly to a horizontal flange 90 which connects to the side wall 42 of the support member 24. The flange 90 is vertically spaced from the upper most end of the side wall 40 of the support member 24 such that the cavity 48 of the support member 24 not only is open upwardly between the side walls 40 and 42 but access to its open end 50 is provided laterally to the cavity 48 throughout the length of the device 20. This construction is believed advantageous to permit easy lay-in of communication conduit into the cavity 48 from the left hand side of the device 20 when the left hand cover 5b is removed.

Figures 16, 17:
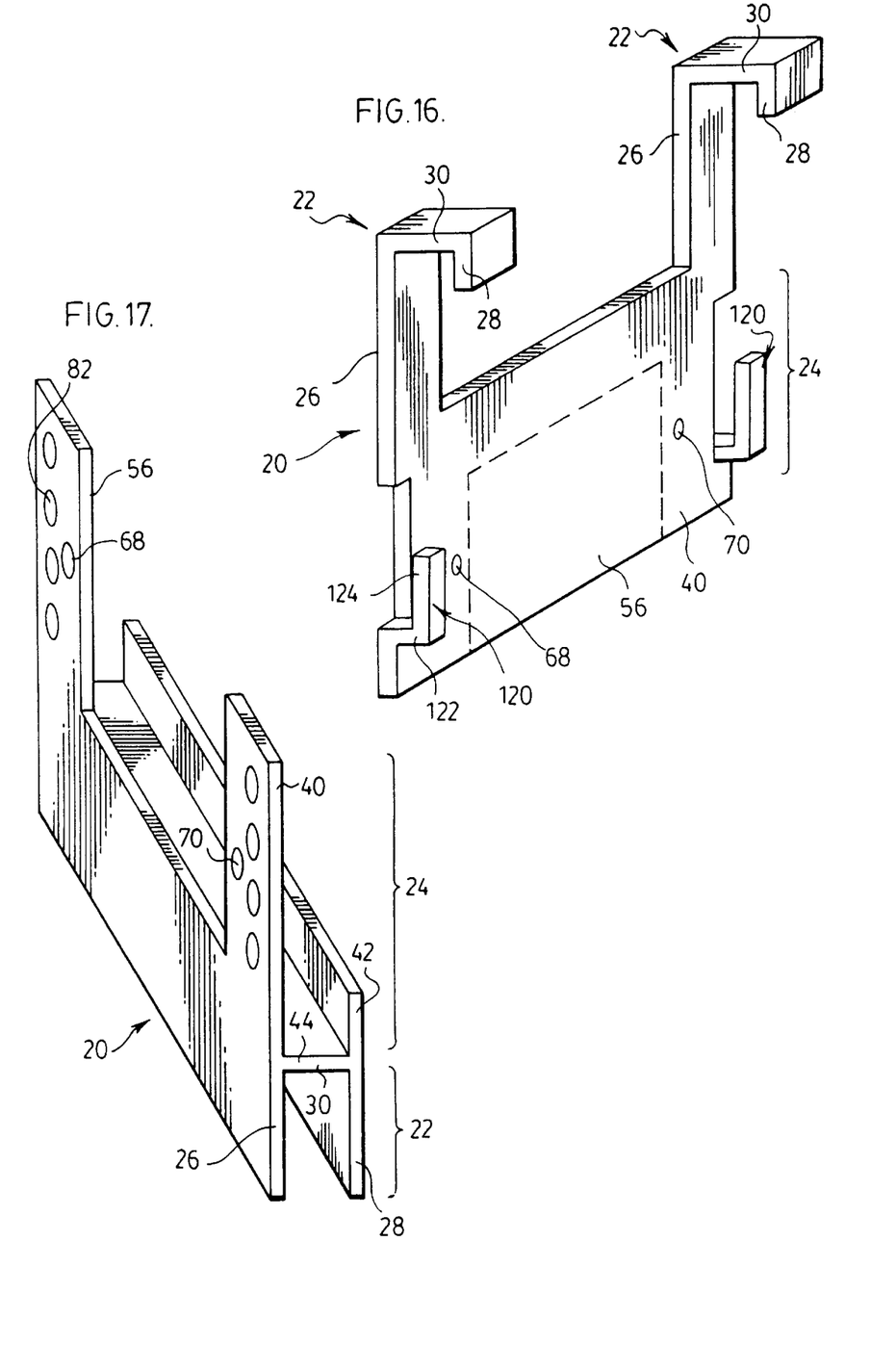
FIG. 16 is a pictorial view of a mounting device in accordance with an eleventh embodiment of the present invention.
FIG. 17 comprises a pictorial view of a twelfth embodiment of the present invention.

Preferably, when initially installing the connector 58, a workman will remove the device 20 from the right hand beam 2 and work on the device with the device held laterally to the left hand side of the partition. A workman may feed the second and third conduits 80 and 84 through the cavity 48 and out the aperture 56 connecting these conduits to the connector 58 and then securing the connector 58 within the aperture 56 on the side wall 40. Next the workman may secure the connector in the aperture 56 and then hang the device 20 on right hand beam 2. As an alternate embodiment to that of FIG. 3, the aperture 56 may be modified such that the portion of the wall 50 indicated in FIG. 3 as 92 is removed where by the aperture 56 comprises an upwardly opening slot such as shown in the embodiment of FIG. 17. With this configuration, it is not necessary to initially pass the second and third conduits 80 and 84 through the aperture 56, rather, the conduits may be connected to the connector 58 separate from the device 20 and then as the connector is moved horizontally into the aperture 56, the conduits 80 and 82 are merely passed vertically downwardly into the cavity 48 via the upwardly opening aperture 56.

The connector support member 24 in the first preferred embodiment illustrated in FIG. 4 is shown with its side wall 42 providing a shield wall to assist in protecting any of the connections between the second and third conduits 80 and 84 at the rear of the connector 58. As well, the side walls 40 and 42 together with the bridging side wall 44 in effect provide a U-shaped upwardly opening trough to assist in retaining conduit therein.

In FIGS. 4, 5 and 6, the connector 58 is located in the aperture 56 provided in the side wall 40 which faces towards the left hand side cover 5b. As an alternative, a similar aperture could also be provided in side wall 42 to receive the connector to face outwardly to the right into the interior space of the right hand cover 5b and with a conduit such as conduit 76 to extend between the side wall 42 and the skin 12 of the right hand cover 5b in the interior space of the right hand cover 5b downward to exit via the gap 99 between the right hand cover 5b and the right hand recessed panel 7. In the context of such an arrangement, the device 20 could be removed and/or engaged merely by removal of right hand cover 5b. The alternate aperture in side wall 42 could be provided as a knockout panel indicated as 91 in FIG. 3 and delineated by dashed lines.

The device 20 as illustrated in FIGS. 5 and 6 shows the connector support member 24 as located in right hand side raceway 41 and extending partially inwardly to the left into the central post space 39 but not extending outwardly to the right into the interior space of the right hand cover 5b.

The mounting device 20 may be configured as may be desired for different needs to control the extent to which the device 20 and/or its support member 24 locate within one or more of the central post space 39, raceway 41 and the interior space within the covers. In this regard, reference is made to FIG. 7 which shows a side view of a partition similar to that of FIG. 6 but showing a mounting device 20 in accordance with a second embodiment of the invention and in which similar elements are referred to with similar reference numbers. The hanger mechanism 22 has its side walls 26, bridging wall 30 and side wall 28 formed in the shape of a smoothly curving hook conforming to the profile of the upper end of the beam 2. The flange 90 which connects side wall 26 to side wall 40 extends diagonally. With the side wall 28 of a shorter vertical length than that of the first embodiment, the side wall 26 can be of lesser length yet permit removal without the flange 90 preventing the side wall 28 from clearing the top of the beam 2.

Figure 7:
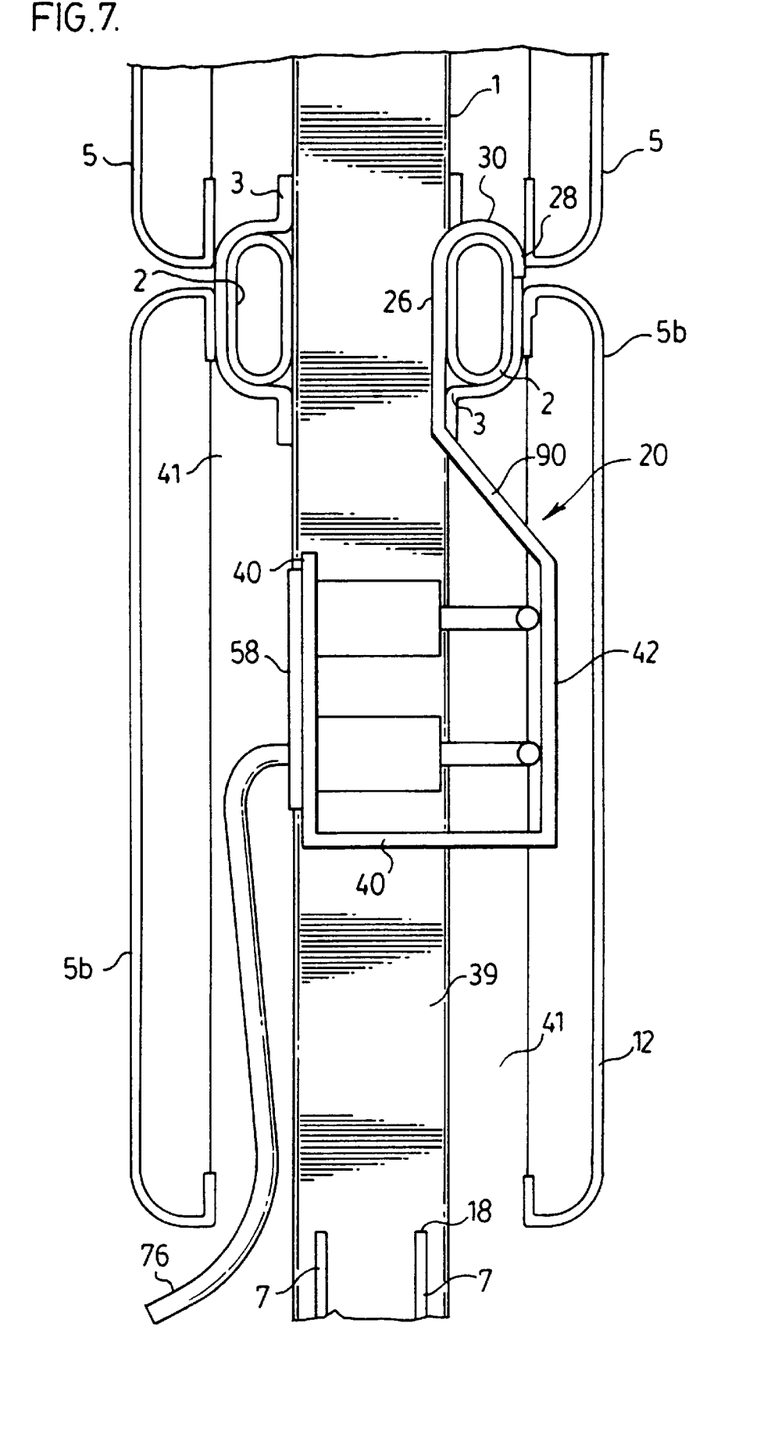
FIG. 7 is a view similar to FIG. 6 but showing a mounting device in accordance with a second embodiment of the invention.

In FIG. 7, the connector support member 24 is located to extend partially into the interior space of the right hand cover 5b and partially into the central post space 39. In FIG. 7, the connector 58 is shown disposed vertically and comprising two connection mechanisms 78 for connection of conduit.

Figure 8:
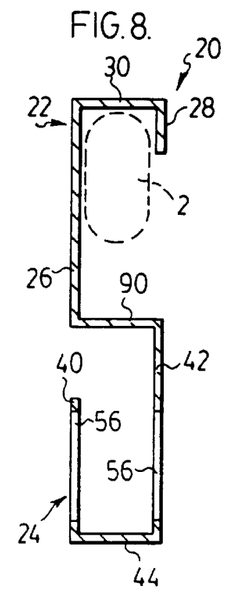
FIGS. 8 to 13 comprise cross-sectional end views of mounting devices in accordance with third to eighth embodiments of the present invention, respectively.
Figure 9:
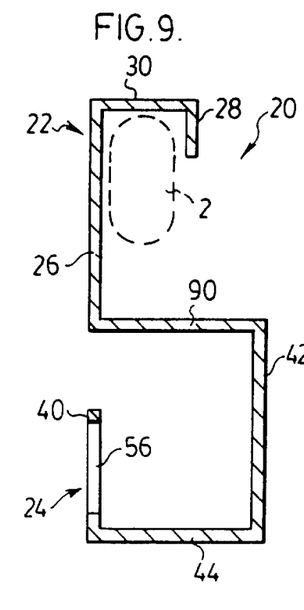
Figure 10:
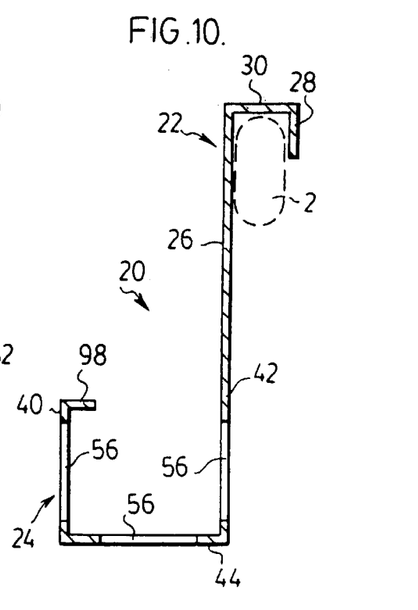

Reference is made to FIGS. 8, 9 and 10 which show schematic cross-sectional side views of third, fourth and fifth embodiments of mounting devices 20 in accordance with the present invention and similar in many respects to the first embodiment of the mounting device 20 shown in FIG. 3 in having a profile of generally S-shape in cross-section. Each of the members shown is illustrated with a hanger mechanism 22 of substantially identical shape and profile to that of the hanger mechanism in the first embodiment of FIG. 3.

The third embodiment of FIG. 8 has been provided such that the channel support member 24 comprises a U-shaped channel member which does not extend laterally beyond the hanger mechanism 22 and thus the sides wall 40 and 42 of the connector support member 24 do not extend laterally beyond the side walls 26 and 28 of the hook mechanism. When utilized in the identical manner to that in FIG. 6, the embodiment of FIG. 8 would be located substantially only in the right hand side raceway 41 leaving the central post space 39 and the interior space within the right hand cover substantially clear.

In FIG. 8, two apertures 56 are shown, one in each of side walls 40 and 42. It may be possible with the hanger mechanism 22 disposed about a right hand beam 2 shown in dotted lines in FIG. 8 to have the connector 58 received either in side wall 40 to be directed towards the left or in side walls 42 to be directed towards the right.

In the fourth embodiment of FIG. 9, the side wall 40 on the left side does not extend to the left beyond the side wall 26 of the hook mechanism 22 however the side wall 42 of the support member 24 in a lower part of the S-shape extends to the right substantially beyond the side wall 28 of the hanger mechanism 22. When utilized in the identical manner to that in FIG. 6 with the hanger mechanism disposed about a right hand beam 2 shown in dotted lines in FIG. 9, the embodiment of FIG. 9 would be located in the raceway 41 and in the interior space within the right hand cover leaving the central post space 39 substantially clear. In FIG. 9, only one aperture 56 is shown in the side wall 40, as when used in the preferred manner as in FIG. 6, there would not be expected to be room for a conduit to extend between the side wall 42 and the skin of the right hand cover.

In the fifth embodiment illustrated in FIG. 10, the side wall 42 of the support member 24 is a vertical extension of the side wall 26 of the hook mechanism 22 and thus the support member 24 is located entirely to the left of the hanger mechanism 22. The embodiment of FIG. 10 provides a return flange 98 on the upper end of the side wall 40 of the support member 24 as may be advantageous to provide additional support to the side wall 40 and to assist in further enclosing the cavity 48.

When utilized in the identical manner to that in FIG. 6 with the hanger mechanism disposed about a right hand beam 2 shown in dotted lines in FIG. 10, the embodiment of FIG. 10 would have its support member 24 located merely within the central post space 39 leaving both the raceways 41 and the interior spaces within the cover is clear. In FIG. 10, three apertures 56 are shown one in each of side walls 40 and 42 and one in bridging wall 44. With the support member 24 mounted in the central post space 39, connectors could readily be used in either side walls 40 or 42 so as to be directed towards either the left side or the right side. As well, in some circumstance, it might be advantageous to have a connector directed downwardly as by locating it in the aperture 56 in the bridging wall 44.

Figure 11:
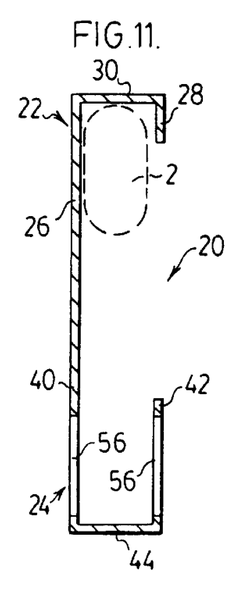
Figure 12:
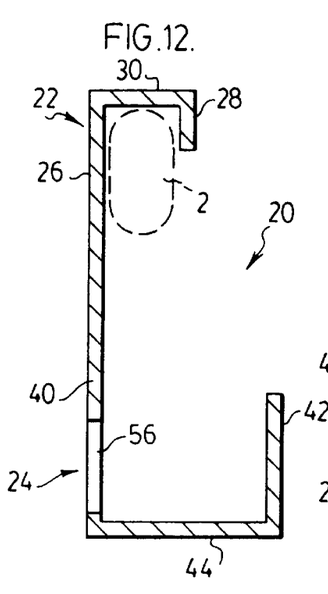
Figure 13:
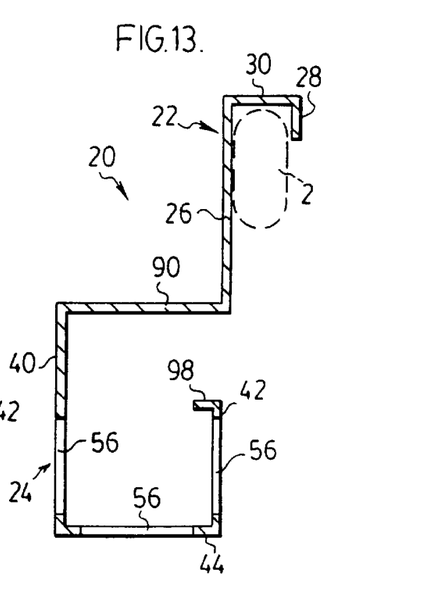

Reference is now made to the sixth, seventh and eighth embodiments illustrated in end cross-sectional views in FIGS. 11, 12 and 13 which illustrate mounting devices 20 similar in many respects to the mounting device of the first embodiment however adopting a generally C-shape in profile. In each the hanger mechanism 22 is substantially identical to that shown in the first embodiment and the connector support member 24 is also substantially the same however the connector support member 24 opens to the same lateral side as the hanger mechanism 22. As seen in each of FIGS. 11, 12 and 13 the connector support member 24 has side walls 40 and 42, and bridging side wall 44 defining cavity 48 with an open side and open ends.

The embodiment of FIG. 11 has its connector support member 24 below the hanger mechanism 22 so as to locate substantially within a raceway 41 in a comparable manner to that described with the embodiment of FIG. 8.

The embodiment of FIG. 12 has its connector support member 24 arranged so as to locate substantially within a raceway 41 and the interior space of a cover in a comparable manner to that described with the embodiment of FIG. 9.

The embodiment of FIG. 13 has its connector support member 24 arranged so as to locate substantially only within the central post space 39 in a comparable manner to that described with the embodiment of FIG. 10. As in FIG. 10, the embodiment of FIG. 13 includes reinforcing flange 98.

The embodiment of FIGS. 8, 10, 11 and 13 are illustrated as having more than one apertures 56 one in the side walls 40 and 42 and the bridging side wall 44. Such apertures are each sized so as to receive a connector 58 therein. Having apertures for the connectors 58 in the different walls provides increase flexibility in use of the mounting device 20 having regard to the desired usage and space configurations in the interior of the panel assembly and the like. The apertures 56 may advantageously be pre-formed. It is also advantageous that all or some of the apertures 56 be provided as knockout areas which can be removed by the application of forces as in known with outlet-boxes generally. Insofar as all the apertures 56 are pre-punched, the walls which are not to receive a connector 58 still continue to serve some shielding and/or supporting function. It is to be appreciated that having the aperture 56 in bridging side wall 44 with the plug 74 to be disposed downwardly could be convenient in some installations.

In the context of a partition system as illustrated in FIGS. 1, 2, 4, 5 and 6, as best shown in FIGS. 5 and 6, it is advantageous that the embodiments of the mounting devices 20 illustrated in FIGS. 3 and 7 to 13 be utilized in an orientation that the side wall 28 forming the distal end of the hook be received on the outside of the beam 2 about which the hanger device 20 is received, that is with the side wall 28 locating in the space between the beam 2 and the covers 5 and 5b. One advantage is that the mounting devices may be engaged into or removed from the beam merely by removing one of the covers 5b. As an alternate orientation which is not illustrated in the drawings, the mounting devices 20 at least of the embodiments shown in FIGS. 8, 9, 11 and 12 could be utilized with the side wall 26 on the inside of the beam 2 about which the hanger device is received, that is, with the side wall 26 located in the space between the beam 2 and the covers 5 and 5b on one side. This has the disadvantage that both covers 5 and 5b on that side must be removed in order that the mounting device may be engaged onto or removed from the beam.

Mounting devices in accordance with the present invention are not limited merely for use with partitions as illustrated in FIGS. 1, 2, 4, 5 and 6. In the context of other partition systems, the hanger mechanism 22 may be useful in different orientations and the nature of the particular partition system, and any removable covers may dictate preferred usages and orientations.

Figure 14:
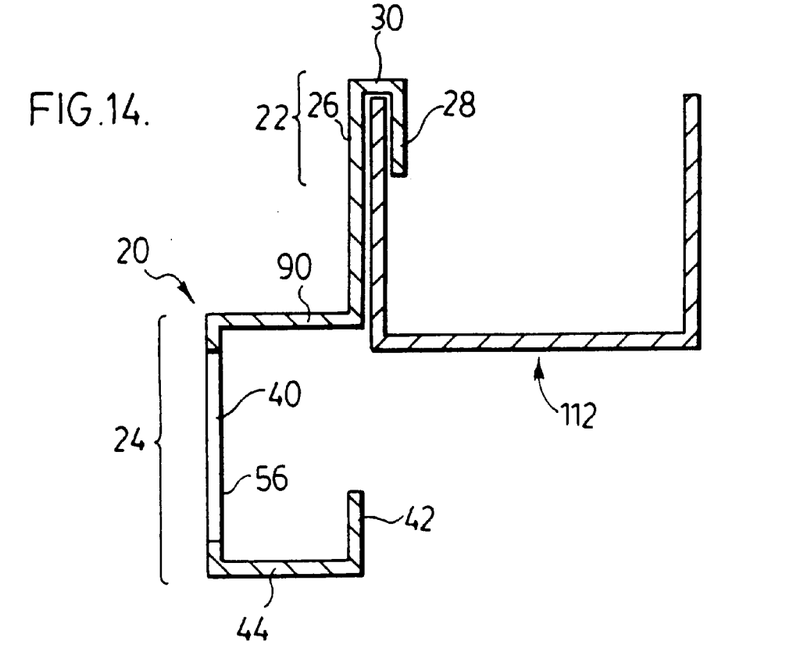
FIG. 14 shows a schematic end view of a ninth embodiment of the present invention in which the mounting device is secured to a U-shaped trough member.

In this regard, reference is made to FIG. 14, FIG. 14 shows a trough 112 formed of sheet metal which extends as a horizontal member coupled to a frame within a panel assembly of a construction is taught for example in U.S. Pat. No. 5,209,035 to Hodges et al. FIG. 14 shows a device 20 in accordance with the ninth embodiment of the invention which has its hanger mechanism 22 adapted as a hook with a suitable spacing in between the side walls 26 and 28 to engage upon one arm of the U-shaped trough 112. The device 20 illustrated in FIG. 14, is similar to that in FIG. 13 with the connector support member 24 laterally outside of the side wall 28 and this permits the device 20 in FIG. 14 to be removed merely by vertically upward movement. While not shown, a removable cover would be provided to the left of the device 20.

Figure 15:
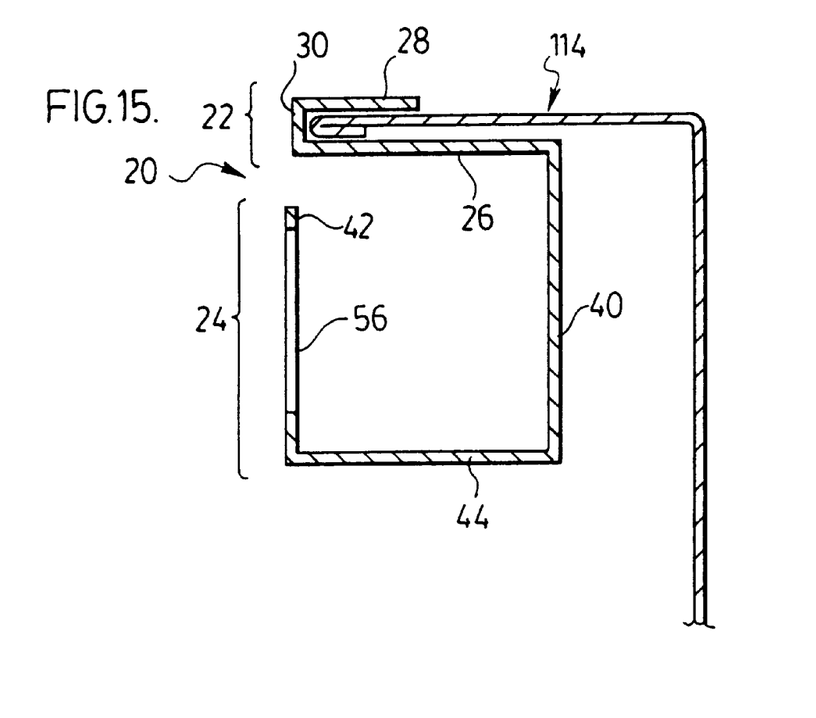
FIG. 15 is a schematic cross-sectional end view of a mounting device in accordance with a tenth embodiment of the present invention secured to a horizontally extending flange member.

Reference is made to FIG. 15 which show a tenth embodiment of the invention accordance with the present invention which is adapted to being engaged upon a horizontal flange 114 comprising a portion of a panel assembly in accordance U.S. Pat. No. 4,685,255 to Kelly. In FIG. 15 the hook mechanism 22 is adapted so as to provide its side arms 26 and 28 disposed horizontally to engage on the flange 114 and support the device 20 therefrom, slidably horizontally therealong. A removable cover not shown would be provided to the left of the device 20.

Reference is made to FIG. 16 which shows a simplified eleventh embodiment of the mounting device 20 in which the hanger mechanism 22 comprises two longitudinally spaced hook members 22 and the connector support member 24 merely comprises a flat planer plate 40 on which aperture 56 is provided as a knock-out which if removed provides an aperture 56 as a U-shaped opening open downwardly. FIG. 16 shows two conduit support hooks 120 each stamped from wall 40 and having a base 122 and leg 124. The hooks are adapted to permit conduit to be laid therein as a manner of securing conduit connected to a connector mounted to wall 40. Other embodiments show the use of pairs of holes 82 to assist in securing conduit. Many other mechanisms may be utilized to assist in securing conduit to the connector support mechanism.

The embodiments illustrated in FIGS. 3 and 7 to 16 are all adapted for manufacture, preferably by forming by bending a sheet of material of relatively uniform thickness, as for example by bending sheet of thin metal as from which appropriate apertures openings and slots may have been previously stamped. Of course, each of the embodiments of FIGS. 3 and 7 to 16 could also be formed as by extrusion from plastic or metal and subsequently punching or handling as to form appropriate apertures slots, holes and the like.

Figure 18:
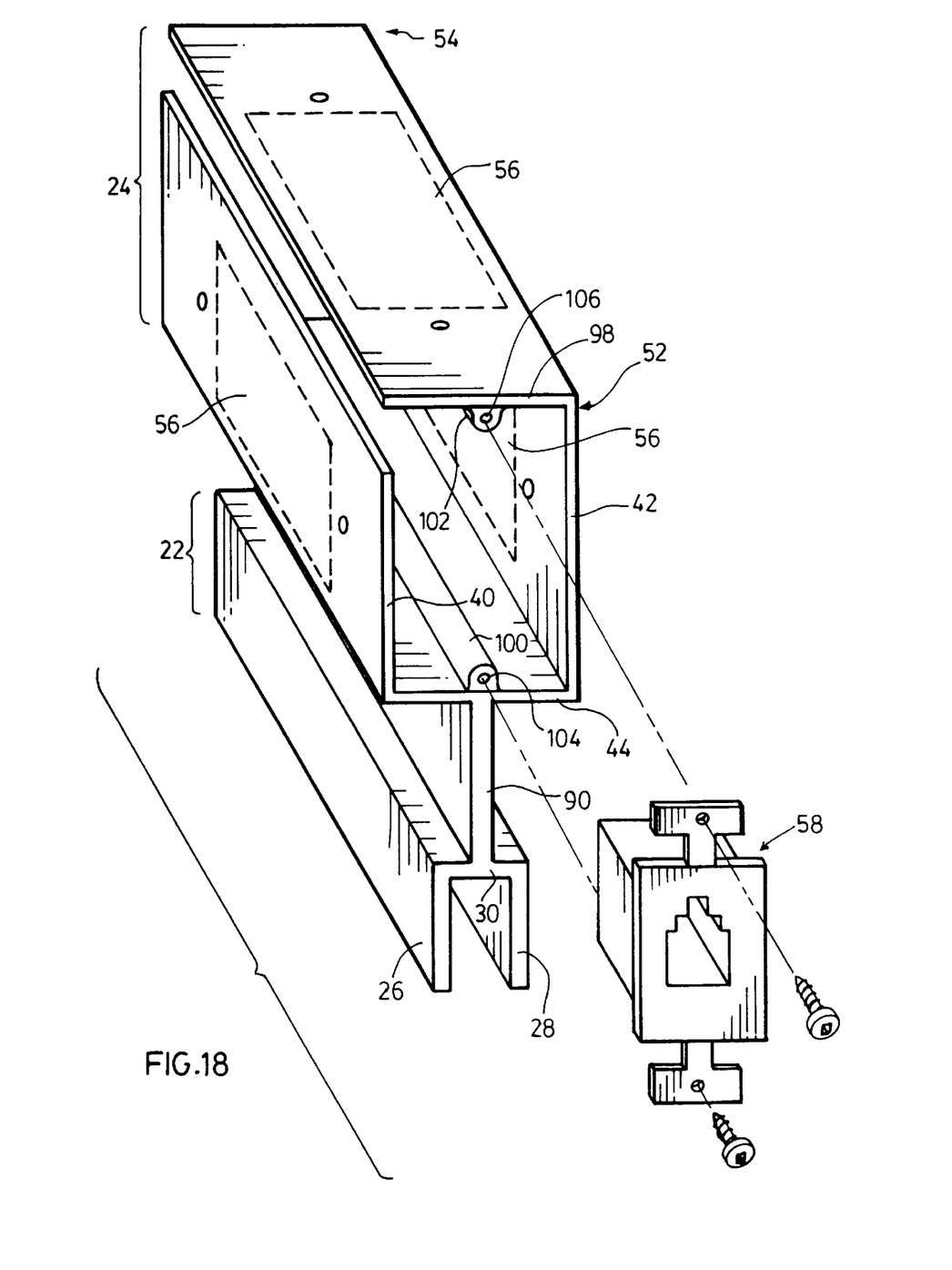
FIG. 18 comprises a schematic exploded pictorial view of a thirteen embodiment of the present invention together with a connector.

Reference is made to FIGS. 17 and 18 which show twelfth and thirteenth embodiments more adapted to manufacture by extension as from plastic and aluminum. Each is adapted such that the hanger mechanism 22 engages about a beam 2 and supports the connector support member 24 thereabove. In the embodiment of FIG. 17, the two U-shaped channels are substantially of the same size with the side wall 40 being an extension of side wall 26 and the side wall 42 being an extension of side wall 28 and with the bridging walls 30 and 44 being common. FIG. 17 shows an aperture 56 as a U-shaped opening upwardly as is advantageous to assist in laying in conduit connected to the rear of a connector 58.

FIG. 18 shows an embodiment in which the connector support member 24 is spaced upwardly from the hook member 22 by a vertical extension flange 90 and with one side wall 42 having a horizontal extension flange 98 to assist in closing the cavity. In FIG. 18 three locations are shown for aperture 56 with one in each of walls 40, 42 and flange 90, preferably as removable knockouts. FIG. 18 shows the connector support member 24 as having two longitudinally extending bosses 100 and 102 each providing a bore 104 and 106 which are spaced apart a distance such that a connector 58 may be secured in each open end 52 and 54 of the connector support member 24 as shown. Such configuration may be advantageous for certain panel assembly configurations. With the connector 58 not completely enclosing either end, the connector support member 24 can continue to permit conduit to pass out the ends.

The first embodiment of FIG. 3 is also adapted to receive a connector 58 across its end in a manner as shown in FIG. 18. In the embodiment of FIG. 3, a U-shaped strip 108 bridging wall 44 is shown as punched upwardly from wall 44 to provide an opening 110 between strip 108 and the wall 44 into which a screw may be engaged extending parallel the longitudinal of the channel member. Similar such strips 108 are provided on flange 90 such that with the wall 44 and flange 90 suitably spaced the connector 58 can be engaged in the end of the connector support member 24 with screws received in the openings 110.

The invention has been described illustrating a preferred connector 58 as illustrated in FIG. 3 and as is adapted for location within an aperture in the connector support member 24 sized to similar proportion as for example found in typical outlet-boxes used in the construction industry. Various other connector devices may be used including those which are used for example in telephone industry for surface mounting of a telephone connection. One such connector includes a substantially rectangular box-like member having an open top and provided with a adhesive on its rear surface covered with a release sheet such that when the release sheet is removed the connector may be secured to flat surface. This connector also includes a removable box like top cap with an open bottom. The connector presents one or more female sockets in its side walls thereof accessible through openings in the side walls of the top for coupling of male plugs such as plug 74 in FIG. 4. Such an adhesive backed connector may readily be applied to a flat surface of a mounting device 20 such is shown in particular in the simple embodiment in FIG. 17.

While all of the preferred embodiments show the apertures 56 adapted for mounting connectors disposed in a plane which is vertical parallel that covers 5 or horizontal normal that covers 5. Is to be appreciated that mounting devices could be provided with disposed connector at any angle whatsoever.

While the invention has been described with reference to preferred embodiments, many modifications or variations will now occur to a person skilled in the art. For definition of the invention references made to the appended claims.

I claim:

1. A communications conduit connector mounting device comprising:
   an outlet box-forming portion comprising a first elongate U-shaped channel member with two parallel side walls joined by a bridging side wall to define an elongate cavity therebetween with the first U-shaped channel member open along its length on one open side between the two opposed side walls and opposite the bridging side wall and with the first channel member open at both ends as first and second open ends, one of the two opposed side walls and the bridging side wall having a major aperture therethrough adapted to receive a conduit conductor, a hook member coupled to the box-forming portion for suspending the outlet box-forming portion.

2. A device as claimed in claim 1 wherein the hook member comprises a second elongate U-shaped channel member extending parallel the first U-shaped channel member, the second U-shaped channel member having two parallel side walls joined by a second bridging side wall to define an elongate hook forming cavity therebetween open along its length on one open side opposite the second bridging side wall and at both ends.

3. A device as claimed in claim 1 wherein the aperture is provided in one of said two parallel side walls of the first U-shaped channel member, and the other of said two parallel side walls carries means for securement of conduit thereto disposed within said cavity and substantially opposite from said aperture.

4. A device as claimed in claim 2 wherein the second U-shaped channel member carries on one of its parallel side walls and bridging side wall means for securement of conduit thereto.

5. A device as claimed in claim 1 wherein said device has a substantially constant cross-section profile in cross-section normal the direction in which the first U-shaped channel member extends.

6. A device as claimed in claim 5 wherein said device is formed from a continuous piece of substantially rigid sheet material.

7. A device as claimed in claim 6 wherein said profile comprises a substantially S shape.

8. A device as claimed in claim 6 wherein said profile comprises a substantially C-shape.

9. A device as claimed in claim 2 wherein when the hook member is orientated with its U-shaped second channel member disposed horizontally opening downwardly with its two parallel side walls generally vertically and its bridging side wall therabove, the first U-shaped channel member has its open side opening upwardly and its two parallel side walls generally vertical.

10. A device as claimed in claim 5 wherein said profile is selected from an S-shape and a C-shape.

11. In a panel assembly comprising a rectangular frame including vertical and horizontal frame members and a cover removably mounted on at least one side of said frame, the improvement comprising a separate, removable cable management apparatus mounted within an internal space defined by said frame and cover, the apparatus comprising:
 a hook mechanism,
 a connector support bracket member carried by the hook mechanism,
 a communications conduit connector for joining together ends of at least two communication conduits for transmission of signals therebetween,
 the connector carried by the bracket member,
 the hook mechanism removably engaging one of the horizontal frame members such that the bracket carrying the connector locates the connector within the internal space disposed for access on removal of the removable cover.

12. The improvement of claim 11 wherein the hook mechanism is movable to a plurality of positions along the length of a horizontal frame member in which in each position the bracket carrying the connector locates the connector within the internal space disposed for access on removal of the removable cover.

13. The improvement of claim 12 wherein
 the hook mechanism is slidably movable along the length of a horizontal frame member.

14. The improvement of claim 12 where the hook mechanism has a bight and two arm portions extending from opposite sides of the bight,
 the bight engaging over an upwardly directly surface of a horizontal frame member with the arm portions extending downwardly on either side of the horizontal frame member.

15. The improvement of claim 11 wherein the bracket member comprises a flat planar mount portion to which the connector is secured, wherein when the hook member engages a horizontal frame member the planar portion is disposed in a vertical plane parallel a longitudinal axis of the horizontal frame member.

16. The improvement of claim 15 wherein the bracket member includes an upwardly directed trough open upwardly and at each of its ends and extending parallel the horizontal frame members and receiving at least one communication conduit therein.

17. The improvement of claim 15 wherein the bracket member includes a planar shield portion extending generally parallel the mount portion, spaced laterally therefrom to provide a partially protected space between the mount portion and shield portion for connections between the connector and at least one of the conduits.

18. The improvement of claim 14 wherein
 a vertically extending lateral space exists between the horizontal frame members and the removable cover,
 a first of the arm portions of the hook mechanism extending downwardly between a horizontal frame member and the removable cover in such lateral space,
 the support bracket member depending from said first arm portion located therebelow,
 the support bracket member comprising an elongate U-shaped channel member extending parallel the horizontal frame member and having two parallel laterally spaced side walls joined by a bridging bottom wall to define an elongate conduit receiving cavity therebetween open at both ends and open upwardly along its length as an upward opening,
 a first of the side walls of the channel member extending upwardly to engage the first arm portion of the hook mechanism such that access to the upward opening of the cavity is provided laterally between the first arm portion of the hook mechanism and a second side wall of the channel members along the entire length of the channel member.

19. The improvement of claim 11 wherein said apparatus permits removal and engagement of the apparatus from the internal space with conduit connected to the connector, by disengagement and engagement respectively, of the hook member from the respective horizontal frame member.

20. The improvement of claim 11 wherein with the said cover removed said apparatus permits removal from the internal space with conduit connected to the connector by disengagement of the hook member from the respective horizontal frame member by mere relative vertical movement of the apparatus upwardly and subsequently horizontally laterally.

21. The improvement of claim 12 wherein a vertically extending lateral space exists between the horizontal frame members and the removable cover laterally to one side of the horizontal frame members and inwardly of the cover,     a first arm of the hook mechanism extends between the respective horizontal frame member and the removable cover in such lateral space,     the support bracket member supported below the hook mechanism by a second arm of the hook mechanism.

22. The improvement of claim 13 wherein the support bracket member comprises an outlet-box framing portion comprising a first elongate U-shaped channel member extending parallel the horizontal frame members open along its length on one side and at both ends.

23. The improvement of claim 13 wherein the hook mechanism comprises a second elongate U-shaped channel member extending parallel the horizontal frame members open along its length on a downward side and at both ends.

24. The improvement of claim 13 wherein the hook mechanism comprises a U-shaped hook channel member extending parallel the horizontal frame members the hook channel member having two parallel side walls joined by a bridging top wall to define an elongate cavity therebetween open on a downward side and at both ends and to receive a respective the frame member longitudinally slidable therein.

25. The improvement of claim 24 wherein the support bracket member comprises a downward opening extension of one of said side walls of the hook channel member.

26. The improvement of claim 24 wherein the support bracket member comprises a U-shaped box channel member extending parallel the hook channel member, the box channel having two parallel laterally spaced vertical side walls joined by a bridging bottom wall to define an elongate cavity therebetween open at an upper side and at both ends,     the connector secured to the sidewall closest the removable cover.

27. The improvement of claim 26 wherein the apparatus has a substantially constant cross-sectional profile in cross section normal the horizontal frame members.

28. The improvement of claim 27 where the apparatus has a profile selected from an S-shape and C-shape.

29. The improvement of claim 12 wherein the hook mechanism in engaging a horizontal frame member in any one position engages the horizontal frame member at locations spaced horizontally along the horizontal frame member sufficient to prevent pivoting of the apparatus about any horizontal axis normal the horizontal frame member.

30. The improvement of claim 13 wherein the hook mechanism engages the respective horizontal frame member on each lateral side thereof to prevent pivoting of the apparatus about any axis parallel the horizontal frame member.

31. The improvement of claim 12 wherein the hook mechanism engages the respective horizontal frame member to fixedly secure the apparatus thereto against pivoting relative the horizontal frame member.

32. The improvement of claim 18 wherein said connector is mounted in an aperture in the second side walls of the channel member,     the second wall of the channel member having an outer surface directed toward said cover and an inner surface directed away from said cover,     the connector presenting outwardly of the outer surface a receptacle for connection with a male or female end plug of one conduit,     the connector presenting inwardly of the inner surface connection means for connection of the end of at least one other conduit.

33. In combination a communications conduit connect mounting device and a communications conduit connector for joining together ends of at least two communications conduit for transmission of signals therebetween, the mounting device comprising     a flat planar support member comprising said connector and depending from a hook member for suspending said flat planar support member disposed vertically thereunder.

\* \* \* \* \*